United States Patent
Roy et al.

(10) Patent No.: US 7,531,274 B1
(45) Date of Patent: *May 12, 2009

(54) SANDWICH ELECTRODE DESIGN HAVING RELATIVELY THIN CURRENT COLLECTORS

(75) Inventors: Mark J. Roy, Buffalo, NY (US); Hong Gan, Williamsville, NY (US); Paul T. Hallifax, Gasport, NY (US)

(73) Assignee: Greatbatch Ltd., Clarence, NY (US)

( * ) Notice: Subject to any disclaimer, the term of this patent is extended or adjusted under 35 U.S.C. 154(b) by 471 days.

This patent is subject to a terminal disclaimer.

(21) Appl. No.: 11/467,664

(22) Filed: Aug. 28, 2006

Related U.S. Application Data

(63) Continuation-in-part of application No. 10/346,998, filed on Jan. 17, 2003, now abandoned.

(60) Provisional application No. 60/349,678, filed on Jan. 17, 2002.

(51) Int. Cl.
 *H01M 4/02* (2006.01)
 *H01M 4/58* (2006.01)

(52) U.S. Cl. .................. 429/233; 429/244; 429/231.95; 429/231.7; 429/245

(58) Field of Classification Search .................. 429/128, 429/129, 131, 231.2, 231.5, 231.7, 231.8, 429/231.9, 231.95, 232, 233, 241, 245, 330, 429/328, 332, 336
See application file for complete search history.

(56) References Cited

U.S. PATENT DOCUMENTS

| | | | |
|---|---|---|---|
| 5,744,258 A | 4/1998 | Bai et al. | |
| 5,843,592 A | 12/1998 | Barker et al. | |
| 6,551,747 B1 * | 4/2003 | Gan | 429/245 |
| 6,645,670 B2 | 11/2003 | Gan | |
| 6,692,865 B2 * | 2/2004 | Gan et al. | 429/128 |
| 6,767,670 B2 * | 7/2004 | Paulot et al. | 429/245 |
| 7,018,743 B2 * | 3/2006 | Guidi et al. | 429/233 |

* cited by examiner

*Primary Examiner*—Bruce F Bell
(74) *Attorney, Agent, or Firm*—Michael F. Scalise

(57) ABSTRACT

A new cathode design has a first cathode active material of a relatively low energy density but of a relatively high rate capability contacted to the outer sides of first and second cathode current collectors and a second cathode active material having a relatively high energy density but of a relatively low rate capability in contact with the inner sides of the current collectors. The first and second current collectors have a thickness in the range of from about 0.001 inches to about 0.002 inches. A conventional Li/SVO cell powering an implantable medical device has the cathode with a current collector of about 0.003 inches. Even though the present current collectors are about one-half as thick as that of a conventional cell, their combined thickness means that the cell has no reduction in current carrying capacity.

21 Claims, 1 Drawing Sheet

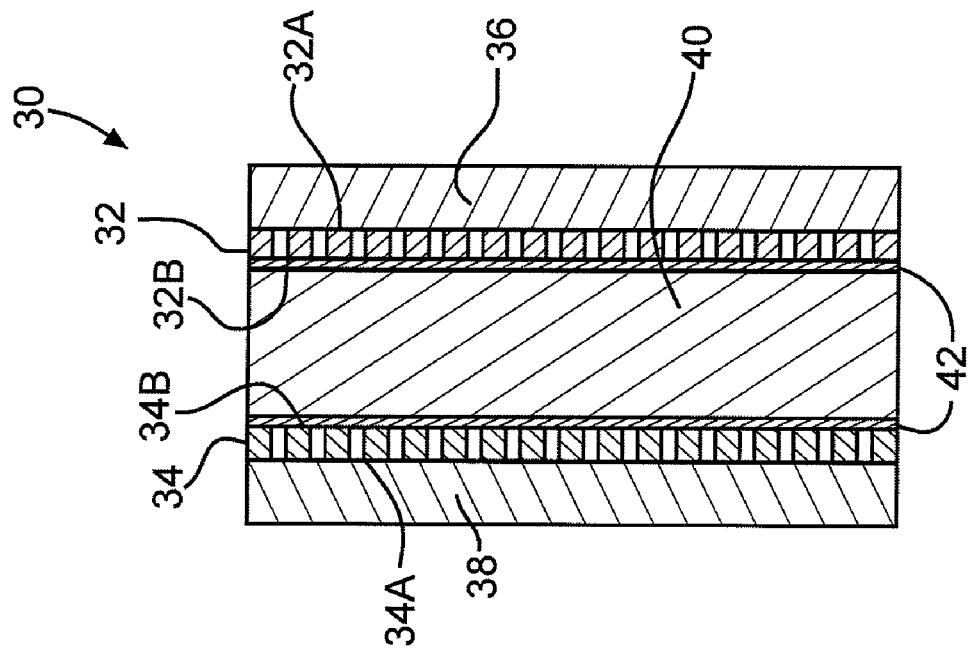
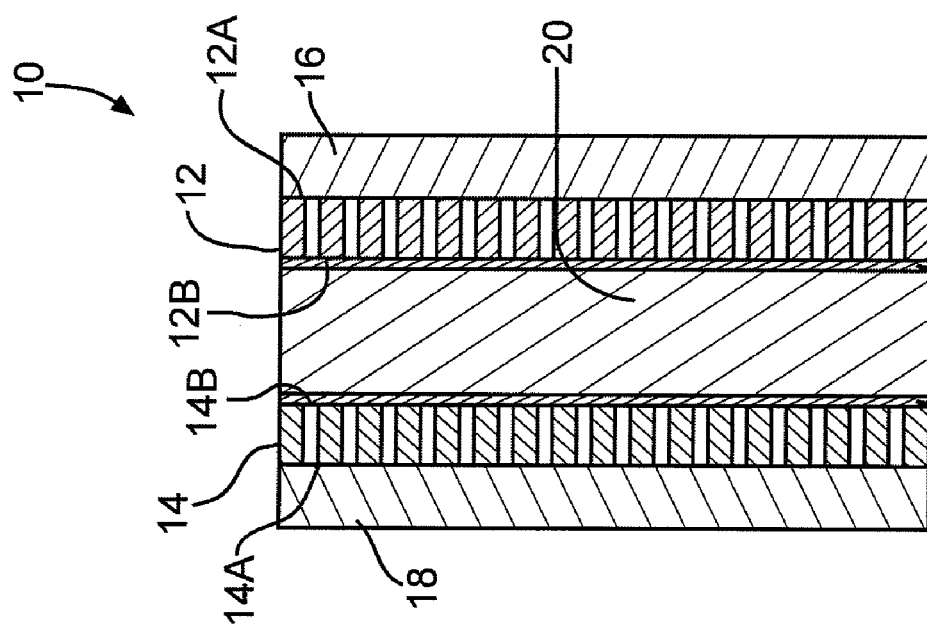

US 7,531,274 B1

SANDWICH ELECTRODE DESIGN HAVING RELATIVELY THIN CURRENT COLLECTORS

CROSS-REFERENCE TO RELATED APPLICATIONS

This application is a continuation-in-part of application Ser. No. 10/346,998, filed Jan. 17, 2003, now abandoned, which claims priority based on provisional application Ser. No. 60/349,678, filed Jan. 17, 2002.

BACKGROUND OF THE INVENTION

1. Field of Invention

This invention relates to the conversion of chemical energy to electrical energy. In particular, the present invention relates to an electrode design having a first cathode active material of a relatively low energy density but of a relatively high rate capability and a second active material having a relatively high energy density but of a relatively low rate capability. The first and second active materials are short circuited to each other by contacting the opposite sides of spaced apart first and second current collectors, the second active material being at an intermediate position with the first active material contacting the opposite, outer current collector sides. A preferred form of the cell has the electrode as a cathode connected to a terminal lead insulated from the casing serving as the negative terminal for the anode electrode. The present electrode design is useful for powering an implantable medical device requiring a high rate discharge application.

2. Prior Art

As is well known by those skilled in the art, an implantable cardiac defibrillator is a device that requires a power source for a generally medium rate, constant resistance load component provided by circuits performing such functions as, for example, the heart sensing and pacing functions. From time-to-time, the cardiac defibrillator may require a generally high rate, pulse discharge load component that occurs, for example, during charging of a capacitor in the defibrillator for the purpose of delivering an electrical shock to the heart to treat tachyarrhythmia, the irregular, rapid heartbeats that can be fatal if left uncorrected.

It is generally recognized that for lithium cells, silver vanadium oxide (SVO) and, in particular, $\epsilon$-phase silver vanadium oxide ($AgV_2O_{5.5}$), is preferred as the cathode active material. This active material has a theoretical volumetric capacity of 1.37 Ah/ml. By comparison, the theoretical volumetric capacity of $CF_x$ material (x=1.1) is 2.42 Ah/ml, which is 1.77 times that of $\epsilon$-phase silver vanadium oxide. For powering a cardiac defibrillator, SVO is preferred because it can deliver high current pulses or high energy within a short period of time. Although $CF_x$ has higher volumetric capacity, it cannot be used in medical devices requiring a high rate discharge application due to its low to medium rate of discharge capability.

A novel electrode construction using both a high rate active material, such as SVO, and a high energy density material, such as $CF_x$, is described in U.S. Pat. Nos. 6,551,747 to Gan and 6,645,670 to Gan. These patents are assigned to the assignee of the present invention and incorporated herein by reference. FIG. 1 is a schematic view of a portion of a cathode electrode 10 according to the Gan patents. Electrode 10 comprises spaced apart current collectors 12 and 14 supporting layers 16 and 18 of a first cathode active material on their respective outer major sides 12A and 14A. The first cathode active materials 16, 18 are of a relatively high rate capability, but of a low energy density (for example, SVO) in comparison to a second cathode active material 20 of a relatively high energy density, but a low rate capability (for example, $CF_x$) sandwiched between and in contact with the inner major sides 12B and 14B of the respective current collectors 12, 14. The current collectors 12, 14 are shown as perforated structures having a carbonaceous material 22 contacting at least the side facing the $CF_x$ material.

The Gan '747 patent further teaches at column 10, lines 29 to 58 that:

"the high volumetric capacity $CF_x$ active material is quantitatively converted into or used as high power energy of the SVO material. It is believed that during high energy pulsing, all the discharge energy is provided by the SVO material. Above the discharge voltage of the $CF_x$ electrode material, only SVO electrode material is discharged with the SVO material providing all of the discharge energy for pulsing as well as for any background load discharging. Under these discharge conditions, the $CF_x$ active material is polarized with respect to the SVO material discharge voltages. Then, when the lithium cells having the sandwich cathodes of the present invention are discharged to the working voltage of the $CF_x$ material, both the SVO and $CF_x$ active materials provide the energy for background load discharging. However, only the SVO material provides energy for high rate pulse discharging. After the SVO active material is pulse discharged, the potential of SVO material tends to drop due to the loss of capacity. When the SVO background voltage drops below the working voltage of the $CF_x$ material, the SVO material is believed to be charged by the $CF_x$ material to bring the discharge voltage of the sandwich cathode materials to an equal value. Therefore, it is believed that the SVO material acts as a rechargeable electrode while at the same time the $CF_x$ material acts as a charger or energy reservoir. As a result, both active materials reach end of service life at the same time."

In that respect, both Gan patents relate to a lithium electrochemical cell where the SVO material is charged by the $CF_x$ material when the formers background voltage falls below that of the $CF_x$ material to bring the discharge voltage of the disparate cathode materials to an equal value. The SVO material acts as a rechargeable electrode while the $CF_x$ material is simultaneously acting as a charger or energy reserve. So, in some sense both Gan patents teach a lithium cell having a cathode with internal re-charge characteristics.

In a typical lithium/silver vanadium oxide cell (Li/SVO) powering an implantable medical device, the cathode current collector supports two layers of SVO contacted to each of its opposed major sides. A typical cathode current collector is of titanium being about 0.003 inches thick. This provides the cathode with sufficient current carrying capability for both the relatively low rate discharge and, more importantly, for the high rate, pulse discharge. However, if the current collectors 12 and 14 (FIG. 1) in the sandwich cathode design described in the previously discussed Gan patents were of a thickness similar to that of a typical Li/SVO cell, the total current collector thickness would be twice as large as the conventional cell. This would detract from the many desirable attributes inherent in the Gan cell constructions including providing ample high pulsing capability for powering modern implantable cardiac defibrillators, and the like, with little or no voltage delay.

SUMMARY OF THE INVENTION

Accordingly, the object of the present invention is to improve the performance of lithium sandwich cathode electrochemical cells by providing a new concept in electrode design. This new design is predicated on the optimization of the relatively high rate capability of a first cathode active material, such as SVO, contacted to one side of a current collector with the relatively high energy density of a second cathode active material, such as $CF_x$, contacted to the other side of the current collector. The separate SVO and $CF_x$ materials are short-circuited to each other through the current collector of a reduced thickness in comparison to a conventional Li/SVO. Providing the active materials in a short circuit relationship means that their respective attributes of high rate and high energy density benefit overall cell discharge performance.

These and other objects of the present invention will become increasingly more apparent to those skilled in the art by reference to the following description and to the appended drawings.

BRIEF DESCRIPTION OF THE DRAWINGS

FIG. 1 is a schematic of a prior art cathode 10 of a high energy density cathode material 20 sandwiched between two current collectors 12, 14 and two layers of a high rate cathode material 16 and 18.

FIG. 2 is a schematic of an exemplary embodiment of a cathode 30 according to the present invention having a high energy density cathode material 40 sandwiched between two current collectors 32, 34 and two layers of a high rate cathode material 36 and 38.

DETAILED DESCRIPTION OF THE PREFERRED EMBODIMENTS

As used herein, the term "pulse" means a short burst of electrical current of significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10-second pulses (23.2 m/cm$^2$) with a 15 second rest between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10 second pulse is suitable for medical implantable applications. However, it could be significantly shorter or longer depending on the specific cell design and chemistry.

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material that serves as the other electrode of the cell. The cathode is preferably of solid materials and the electrochemical reaction at the cathode involves conversion of ions that migrate from the anode to the cathode into atomic or molecular forms. The solid cathode may comprise a first active material of a metal element, a metal oxide, a mixed metal oxide and a metal sulfide, and combinations thereof and a second active material of a carbonaceous chemistry. The metal oxide, the mixed metal oxide and the metal sulfide of the first active material has a relatively lower energy density but a relatively higher rate capability than the second active material.

The first active material is formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups, IB, IIB, IIIB, IVB, VB, VIIB, VIIB and VIII, which includes the noble metals and/or other oxide and sulfide compounds. A preferred cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combinations and mixtures of phases thereof. For a more detailed description of such cathode active materials reference U.S. Pat. No. 4,310,609 to Liang et al. This patent is assigned to the assignee of the present invention and incorporated herein by reference.

Another preferred composite transition metal oxide cathode material includes $V_2O_z$ wherein z≦5 combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about 0.01≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and 5,516,340 to Takeuchi et al., both of which are assigned to the assignee of the present invention and incorporated herein by reference.

The cathode design of the present invention further includes a second active material of a relatively high energy density and a relatively low rate capability in comparison to the first cathode active material. The second active material is preferably a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.2 and 1.2, and $(C_2F)_n$ wherein the n refers to the number of monomer units which can vary widely. The true density of $CF_x$ is 2.70 g/ml and its theoretical capacity is 2.42 Ah/ml.

In a broader sense, it is contemplated by the scope of the present invention that the first cathode active material is any material that has a relatively lower energy density but a relatively higher rate capability than the second active material. In addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the first active material. And, in addition to fluorinated carbon, $Ag_2O$, $Ag_2O_2$, CuF, $Ag_2CrO_4$, $MnO_2$, and even SVO itself, are useful as the second active material. The theoretical volumetric capacity (Ah/ml) of $CF_x$ is 2.42, $Ag_2O_2$ is 3.24, $Ag_2O$ is 1.65 and $AgV_2O_{5.5}$ is 1.37. Thus, $CF_x$, $Ag_2O_2$, $Ag_2O$, all have higher theoretical volumetric capacities than that of SVO.

Before fabrication into an electrode structure for incorporation into an electrochemical cell according to the present invention, the first cathode active material prepared as described above is preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the first cathode mixture to improve conductivity. Suitable materials for this purpose include acetylene black, carbon black and/or graphite or a metallic powder such as powdered nickel, aluminum, titanium and stainless steel. The preferred first cathode active mixture thus includes a powdered fluoro-polymer binder present at about 3 weight percent, a conductive diluent present at about 3 weight percent and about 94 weight percent of the cathode active material.

The second cathode active mixture includes a fluoro-polymer binder present at about 1 to 4 weight percent, a conductive diluent present at about 1 to 5 weight percent and about 91 to 98 weight percent of the cathode active material. A preferred second active mixture is, by weight, 91% to 98% $CF_x$, 4% to 1% PTFE and 5% to 1% carbon black.

Cathode components for incorporation into an electrochemical cell according to the present invention may be prepared by rolling, spreading or pressing the first and second cathode active materials onto a suitable current collector selected from the group consisting of stainless steel, titanium, tantalum, platinum, aluminum, gold, nickel, and alloys thereof. The preferred current collector material is titanium, and most preferably the titanium cathode current collector has a thin layer of graphite/carbon paint applied thereto. The coating is provided in a range of about 0.0001 inches to about 0.0010 inches, and more preferably in a range of about 0.0004 to about 0.0005 inches (10 microns to about 12.7 microns).

Preferably, a finely divided graphite pigment in an alcohol-based epoxy resin solution is used as the coating material. One of dipping, painting, doctor-blading, pressurized air atomization spraying, aerosolized spraying, or sol-gel deposition is used to contact the carbonaceous material to the current collector substrate. Spraying is a preferred method. A particularly preferred material is commercially available from Acheson Industries, Inc., Port Huron, Mich. under the designation ELECTRODAG 213®. This material is a colloidal suspension of graphite, propylene glycol methyl ether acetate, toluene, formaldehyde, xylene, 2-butoxyethanol and proprietary epoxy and thermoset resins. The thusly-coated substrate is then sintered at a temperature of about 230° C. to about 350° C. for about 30 minutes to 1.5 hours. More preferably, the carbonaceous coating is applied to a thickness of about 0.0004 inches and sintered at about 300° C. for at least about one hour.

Cathodes prepared as described above may be in the form of one or more plates operatively associated with at least one or more plates of anode material, or in the form of a strip wound with a corresponding strip of anode material in a structure similar to a "jellyroll".

FIG. 2 is a schematic view of a portion of a cathode electrode 30 according to the present invention. Electrode 30 comprises spaced apart current collectors 32 and 34 supporting layers 36 and 38 of a first cathode active material on their respective outer major sides 32A and 34A. The first cathode active materials 36, 38, for example SVO, are of a relatively high rate capability, but of a low energy density. In comparison, the second cathode active material 40, for example $CF_x$, is sandwiched between the respective current collectors 32, 34. The $CF_x$ material does not directly contact the inner major sides 32B and 34B of the preferred titanium current collectors. Instead, a relatively thin coating 42 of the previously described carbonaceous material is in direct contact with at least the inner major current collector sides 32B, 34B. For ease of manufacturing, both major sides of each current collector are provided with the carbonaceous material. The carbonaceous material helps prevent the formation of highly corrosive TiF on the current collectors. The current collectors 32, 34 are shown as perforated structures.

In comparison to the prior art cathode 10 described with respect to FIG. 1, the present electrode has the current collectors each of a thickness from about 0.002 inches to about 0.001 inches, about 0.0015 inches thick being preferred. The current collectors can be of the same or different thicknesses. Nonetheless, their thicknesses are about half that of the prior described cathode 10. This means that there is no diminution in current carrying capability in comparison to a conventional Li/SVO cell, as the total current collector thickness is similar. However, in comparison to the prior art cathode 10, the reduction in total cathode current collector thickness means that there is more volume for active components.

Of note is U.S. Pat. No. 5,843,592 to Barker et al. This patent describes a secondary lithium electrochemical cell that is prevented from being over discharged by "employing current collectors therein that comprise a redox polymer so that each current collector is essentially non-conducting when the redox polymer is in the non-oxidized non-reduced state." The current collector supporting the redox polymer "has a thickness from about 25 μm to about 75 μm". In the present invention there is no need for a redox polymer intermediate the current collectors and the respective SVO and $CF_x$ materials. This is because the SVO component is capable of being discharged below the working voltage of the $CF_x$ material with subsequent recharging of the SVO material by the $CF_x$ material. Furthermore, a redox polymer coating on the respective current collectors would detract from the cell's volumetric efficiency. Improving the cell's volumetric efficiency is the reason for the relatively thin current collectors 32, 34 in the first place.

While not shown in the drawings, the cathode current collectors 32 and 34 are connected to a common terminal insulated from the cell casing (not shown) by a suitable glass-to-metal seal. This describes a case-negative cell design, which is the preferred form of the present invention cell. The cell can also be built in a case-positive design with the cathode current collectors contacted to the casing and the anode current collector connected to a terminal lead insulated from the casing. In a further embodiment, the cell is built in a case-neutral configuration with both the anode and the cathode connected to respective terminal leads insulated from the casing. These terminal constructions are well known by those skilled in the art.

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene/polyethylene membrane commercially available under the designation CELGARD (Celanese Plastic Company, Inc.), a membrane commercially available under the designation DEXIGLAS (C.H. Dexter, Div., Dexter Corp.), and a polyethylene membrane commercially available from Tonen Chemical Corp.

The electrochemical cell of the present invention further includes a nonaqueous, ionically conductive electrolyte that serves as a medium for migration of ions between the anode and the cathode electrodes during the electrochemical reactions of the cell. The electrochemical reaction at the electrodes involves conversion of ions in atomic or molecular forms that migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a mixture of aprotic organic solvents comprising a low viscosity solvent and a high permittivity solvent. In the case of an anode comprising lithium, preferred lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME),1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate and 1,2-dimethoxyethane.

The corrosion resistant glass used in the glass-to-metal seals has up to about 50% by weight silicon such as CABAL 12, TA 23, FUSITE 425 or FUSITE 435. The positive terminal leads preferably comprise molybdenum, although titanium, aluminum, nickel alloy, or stainless steel can also be used. The cell casing is an open container of a conductive material selected from nickel, aluminum, stainless steel, mild steel, tantalum and titanium. The casing is hermetically sealed with a lid, typically of a material similar to that of the casing.

According to the present invention, end of service life indication is the same as that of a standard Li/SVO cell as SVO and $CF_x$ reach end of life at the same time. This is the case in spite of the varied usage in actual defibrillator applications. Since both electrode materials reach end of service life at the same time, no energy capacity is wasted.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
  a) an anode of an alkali metal;
  b) a cathode of one of a first cathode active material having a relatively low energy density but a relatively high rate capability and a second cathode active material having a relatively high energy density but a relatively low rate capability contacted to outer major sides of a first cathode current collector and a second cathode current collector, and the other of the first and second cathode active materials contacted to inner major sides of the first and second cathode cathode current collectors, wherein the first and second current collectors each have a thickness of from about 0.001 inches to about 0.002 inches and they are devoid of a redox polymer film intermediate the first and second cathode active materials; and
  c) a nonaqueous electrolyte activating the anode and the cathode.

2. The electrochemical cell of claim 1 wherein the first and second cathode current collectors have the same or different thicknesses.

3. The electrochemical cell of claim 1 wherein the first cathode active material is selected from the group consisting of silver vanadium oxide (SVO), copper silver vanadium oxide (CSVO), $V_2O_5$, $MnO_2$, $LiCoO_2$, $LiNiO_2$, $LiMnO_2$, $CuO_2$, $TiS_2$, $Cu_2S$, FeS, $FeS_2$, copper vanadium oxide, and mixtures thereof.

4. The electrochemical cell of claim 1 wherein the second cathode active material is selected from the group consisting of $CF_x$, $Ag_2O$, $Ag_2O_2$, CuF, $Ag_2CrO_4$, $MnO_2$, SVO, and mixtures thereof.

5. The electrochemical cell of claim 1 wherein the first and second cathode current collectors are selected from the group consisting of stainless steel, titanium, tantalum, platinum, aluminum, gold, nickel, and alloys thereof.

6. The electrochemical cell of claim 1 wherein the first and second cathode current collectors are titanium having a graphite/carbon material coated thereon.

7. The electrochemical cell of claim 1 wherein the anode is lithium, the first cathode active material is SVO contacted to the outer major sides of the first and second cathode current collectors, and the second cathode active material is $CF_x$ contacted to the inner major sides of the first and second cathode current collectors.

8. The electrochemical cell of claim 1 wherein the alkali metal is in the form of at least one plate contacted to an anode current collector.

9. The electrochemical cell of claim 1 wherein the first and the second cathode active materials are connected to a common terminal insulated from a casing for the cell.

10. The electrochemical cell of claim 1 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

11. The electrochemical cell of claim 10 wherein the first solvent is selected from the group consisting of tetrahydrofuran, methyl acetate, diglyme, trigylme, tetragylme, dimethyl carbonate, 1,2-dimethoxyethane, 1,2-diethoxyethane, 1-ethoxy,2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl, formamide, dimethyl acetamide, γ-valerolactone, γ-butyrolactone, N-methyl-2-pyrrolidone, and mixtures thereof.

12. The electrochemical cell of claim 1 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

13. An electrochemical cell, which comprises:
  a) an anode comprising lithium;
  b) a cathode of silver vanadium oxide contacted to outer major sides of a first cathode current collector and second cathode current collector and fluorinated carbon contacted to inner major sides of the first and second cathode current collectors, wherein the first and second cathode current collectors each have a thickness from about 0.001 inches to about 0.002 inches and they are devoid of a redox polymer film intermediate the first and second cathode active materials; and
  c) a nonaqueous electrolyte activating the anode and the cathode.

14. The electrochemical cell of claim 13 wherein the first and second cathode current collectors have the same or different thicknesses.

15. The electrochemical cell of claim 13 wherein the first and second cathode current collectors are selected from the group consisting of stainless steel, titanium, tantalum, platinum, aluminum, gold, nickel, and alloys thereof.

16. A method for powering an implantable medical device, comprising the steps of:
  a) providing the medical device;
  b) providing an electrochemical cell comprising the steps of:
    i) providing an anode of an alkali metal;
    ii) providing a cathode of a first cathode active material having a relatively low energy density but a relatively high rate capability contacted to outer major sides of a first cathode current collector and a second cathode current collector and a second cathode active material having a relatively high energy density but a relatively low rate capability contacted to inner major sides of the first and second cathode current collectors, and further including providing the first and second cathode current collectors each having a thickness of from about 0.001 inches to about 0.002 inches and being devoid of a redox polymer film intermediate the first and second cathode active materials; and
    iii) activating the anode and cathode with an electrolyte; and
  c) electrically connecting the electrochemical cell to the medical device.

17. The method of claim 16 including
providing the first and second cathode current collectors having the same or different thicknesses.

18. The method of claim 16 including connecting the first and second cathode current collectors to a common terminal.

19. The method of claim 16 including selecting the first cathode active material from the group consisting of SVO, CSVO, $V_2O_5$, $MnO_2$, $LiCoO_2$, $LiNiO_2$, $LiMnO_2$, $CuO_2$, $TiS_2$, $Cu_2S$, FeS, $FeS_2$, copper vanadium oxide, and mixtures thereof.

20. The method of claim 16 including selecting the second cathode active material from the group consisting of $CF_x$, $Ag_2O$, $Ag_2O_2$, CuF, $Ag_2CrO_4$, $MnO_2$, SVO, and mixtures thereof.

21. The method of claim 16 wherein the anode is lithium, the first cathode active material is SVO, and the second cathode active material is $CF_x$.

* * * * *

UNITED STATES PATENT AND TRADEMARK OFFICE
CERTIFICATE OF CORRECTION

| | | |
|---|---|---|
| PATENT NO. | : 7,531,274 B1 | Page 1 of 1 |
| APPLICATION NO. | : 11/467664 | |
| DATED | : May 12, 2009 | |
| INVENTOR(S) | : Mark J. Roy, Hong Gan and Paul T. Hallifax | |

It is certified that error appears in the above-identified patent and that said Letters Patent is hereby corrected as shown below:

Column 3, line 44: delete "(23.2 m/cm$^2$)" and insert --(23.2 mA/cm$^2$)--

Column 4, line 30: delete "VB, VIIB, VIIB" and insert --VB, VIB, VIIB--

Column 8, line 46: delete "second cathode cathode current" and insert --second cathode current--

Signed and Sealed this

First Day of September, 2009

David J. Kappos
*Director of the United States Patent and Trademark Office*